United States Patent [19]

Hach et al.

[11] Patent Number: 4,993,634

[45] Date of Patent: * Feb. 19, 1991

[54] PROGRAMMABLE CHEMICAL APPLICATION SYSTEM

[75] Inventors: Clifford C. Hach; Keith M. Gawlik, both of Loveland, Colo.

[73] Assignee: Hach Company, Loveland, Colo.

[*] Notice: The portion of the term of this patent subsequent to Nov. 7, 2006 has been disclaimed.

[21] Appl. No.: 426,055

[22] Filed: Oct. 24, 1989

Related U.S. Application Data

[63] Continuation-in-part of Ser. No. 227,707, Aug. 3, 1988, Pat. No. 4,878,614.

[51] Int. Cl.⁵ .................... A01C 23/04; A01G 25/09
[52] U.S. Cl. ........................... 239/10; 239/727; 239/728
[58] Field of Search .................. 239/10, 383, 727–729, 239/380

[56] References Cited

U.S. PATENT DOCUMENTS

| | | | |
|---|---|---|---|
| 4,033,508 | 7/1977 | Jacobi et al. | 239/729 |
| 4,063,569 | 12/1977 | Olson et al. | 239/729 X |
| 4,630,773 | 12/1986 | Ortlip | 239/1 |
| 4,878,614 | 11/1989 | Hach et al. | 239/10 |

FOREIGN PATENT DOCUMENTS

| | | | |
|---|---|---|---|
| 1337002 | 9/1987 | U.S.S.R. | 239/729 |
| 2026826 | 2/1980 | United Kingdom | 239/729 |

Primary Examiner—Andres Kashnikow
Assistant Examiner—William Grant
Attorney, Agent, or Firm—Dean P. Edmundson

[57] ABSTRACT

A system for programming and controlling the rate at which an agricultural chemcial (e.g., fertilizer) is supplied to the water in an agricultural irrigation system. In one embodiment the system is combined with a center pivot irrigation system having a vertical water feed pipe, a horizontal boom, and a chemical supply connected to the feed pipe. A rotation sensor determines the degree of rotation of the boom and a controller controls the amount of chemical supplied to the feed pipe. The system enables the amount of chemical applied to be varied from one section of a field to another.

19 Claims, 5 Drawing Sheets

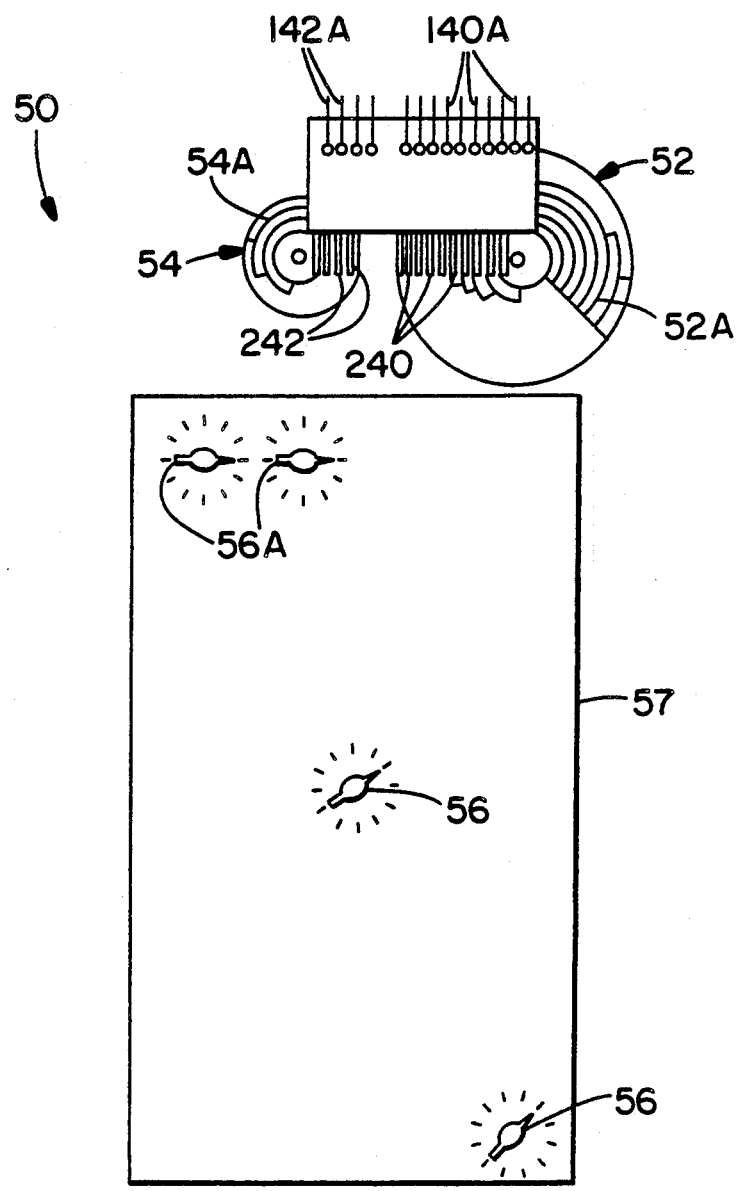

PROGRAMMABLE CHEMICAL APPLICATION SYSTEM

CROSS-REFERENCE TO RELATED APPLICATION

This application is a continuation in-part of our co-pending application Ser. No. 07/227,707, filed Aug. 3, 1988, now U.S. Pat. No. 4,878,614.

FIELD OF THE INVENTION

This invention relates to spray irrigation systems for agricultural use. More particularly, this invention relates to chemical (e.g., fertilizer) application and control systems for use in connection with conventional spray irrigation systems.

BACKGROUND OF THE INVENTION

Spray irrigation systems are currently used widely in agriculture to provide the water requirements for growing crops (e.g., corn). It is common practice to inject fertilizer into the water which is fed into the irrigation pipes so as to fertilize the crop simultaneously with watering. This is convenient, economical and can be done without use of labor. The time of application is optional, and the rate of feeding of the fertilizer is predetermined and is set in order to provide uniform application to an entire field of crops.

In the usual practice the fertilizer used is a solution of nitrogen compounds or other water soluble materials. Usually, a manually adjustable feed pump is used to meter and feed the fertilizer solution into the water stream flowing through the supply pipe of an irrigation system.

One of the most commonly used irrigation systems is the pivot type, wherein a length of pipe supported by drive wheels is connected at one end to a vertical feed pipe through a rotary joint. Numerous spray nozzles are appropriately arranged along the length of the horizontal pipe (referred to as a boom) through which the water sprays over the crops as the boom pivots around the center of the field.

The horizontal pipe or boom often is one quarter mile long, and thus a circle one-half mile in diameter is covered by one irrigation system. This amounts to about 130 acres being irrigated out of a 160-acre quarter section of farm land. Much longer irrigators are used as well.

The fertilizer solution is usually contained in a tank, located at the center of the pivot. An adjustable feed pump accurately meters the flow of fertilizer from the tank and injects it into the water as it flows under pressure to the pivot. The boom (horizontal irrigation pipe) is supported by power-driven wheels, which rotate the boom around the central pivot, and often results in one revolution of the boom in about 48 hours. Often about an inch of water is uniformly applied during a single rotation of the boom. The water flow rate and speed of rotation are manually adjustable.

The liquid fertilizer feed rate is commonly adjusted to an appropriate desired rate, and left at this fixed rate, until it is desired to change the rate. This is often done during the growing season of the crop. The rate of application of the fertilizer at different stages of crop growth is selected according to the best judgment or desires of the pivot supervisor or farm manager.

Various automated sprinkler systems have been previously described, including center pivot systems and lateral systems. Some of such systems include the capability of applying agricultural chemicals of one type or another to the crops. For example, some systems include means for applying herbicides, insecticides, pesticides, or fertilizer to the crops, either by dissolving such chemicals in the irrigation water to be applied to the crops or by including a separate sprinkler system carried by the irrigation sprinkler system. See, for example, U.S. Pat. Nos. 2,726,895; 3,326,232; 3,410,490; 3,464,626; 3,648,930; 3,669,353; 3,680,778; 3,703,990; 3,844,481; 3,901,442; 4,067,497; 4,277,026; and 4,397,421.

None of such prior systems, however, describe any means for determining what is the most efficient rate of application of agricultural chemical (e.g., fertilizer or other agricultural chemical) in an irrigation system. Thus, a farmer or grower is left to guess at the proper application rate, or to use trial and error techniques over a period of years, or to attempt to approximate the application rate recommended by agricultural agents or various agricultural publications.

The problem is compounded by the fact that soil will vary in constituency from one area of a county to another, or even from one field to another. Soil will also vary in presence of available nutrients from one location to another. Further, weather conditions will vary from one area to another and there is some belief that certain weather phenomena can have an effect on the amount of certain elements found in the soil.

Moreover, the types of crops grown on a particular field in a prior season will affect the types and amounts of nutrients remaining in the soil. Other factors can also affect this.

As a result, efficient use of fertilizer, for example, is very difficult to achieve. Also, the timing of fertilizer application can be critical to achieving the most effective use of the fertilizer. For example, if the fertilizer is not applied to the growing crops in the proper amount and at the proper time there will not be efficient use of the fertilizer.

SUMMARY OF THE PRESENT INVENTION

In accordance with the present invention there is provided a system for programming and controlling the rate and, optionally, the timing at which an agricultural chemical (e.g., fertilizer) is supplied to the water in an agricultural irrigation system.

In one embodiment the system of the invention is combined with a center pivot irrigation system having a vertical water feed pipe, a horizontal sprinkler boom operably coupled to the upper end of the feed pipe by means of a rotatable connector, and an agricultural chemical supply means connected to the water feed pipe. A rotation sensor is operably connected to the rotatable connector and is adapted to determine the degree of rotation of the horizontal sprinkler boom relative to the vertical feed pipe. Control means is operably connected to the rotation sensor means and is adapted to control the amount of agricultural chemical (e.g., fertilizer) supplied to the feed pipe, and optionally the timing of such supply, in response to rotation of the sprinkler boom relative to the vertical feed pipe.

The system of the invention allows for programming of the rate of application, and time of application, of an agricultural chemical such as fertilizer to growing crops. The rate of application may be varied from one segment of the field to another.

For example, the system of this invention allows experimentation to be conducted in a field of growing crops to determine the effects of rate of application of a chemical (e.g., fertilizer) to the crop. It also allows for experimentation in regards to the timing of application of the chemical to the crop (e.g., whether application of chemical early in the growing season produces better results than application of chemical later in the season).

In one embodiment there is provided a programmable control system which enables agricultural chemical (e.g., fertilizer) to be applied at different times or different amounts to separate segments of the area covered by an irrigation system.

In a specific example, the system of the invention may be used to control application of a specified amount of chemical (e.g, fertilizer) to growing crops in a manner such that all segments of the field receive the same amount during the season, but the chemical is applied to different segments of the field over different periods of time. This allows direct comparison between separate segments of the field to determine whether the timing of application of the chemical affects the growth rate or yield of the crop.

Other embodiments, and the advantages of the systems of the present invention, will be apparent from the following detailed description and the appended drawings.

BRIEF DESCRIPTION OF THE DRAWINGS

The invention is described in more detail hereinafter with reference to the accompanying drawings, wherein like reference characters refer to the same parts throughout the several views and in which:

FIG. 4 is an elevational view showing the control systems useful in the present invention.

DETAILED DESCRIPTION OF THE INVENTION

In order to provide a very convenient way to conduct trials to determine the optimum rate and timing of fertilizer or other chemical application to a growing crop, a means is herein described by which the application rate of the fertilizer or chemical to the crop can be varied according to a preprogram from low to higher rate with respect to the degrees of rotation of the boom. This is accomplished by attaching to the rotating boom a sensor that detects rotational position and provides such information to a controller which automatically controls the rate, and optionally the timing of pumping of the liquid fertilizer or chemical into the irrigation water stream.

Figure 1:
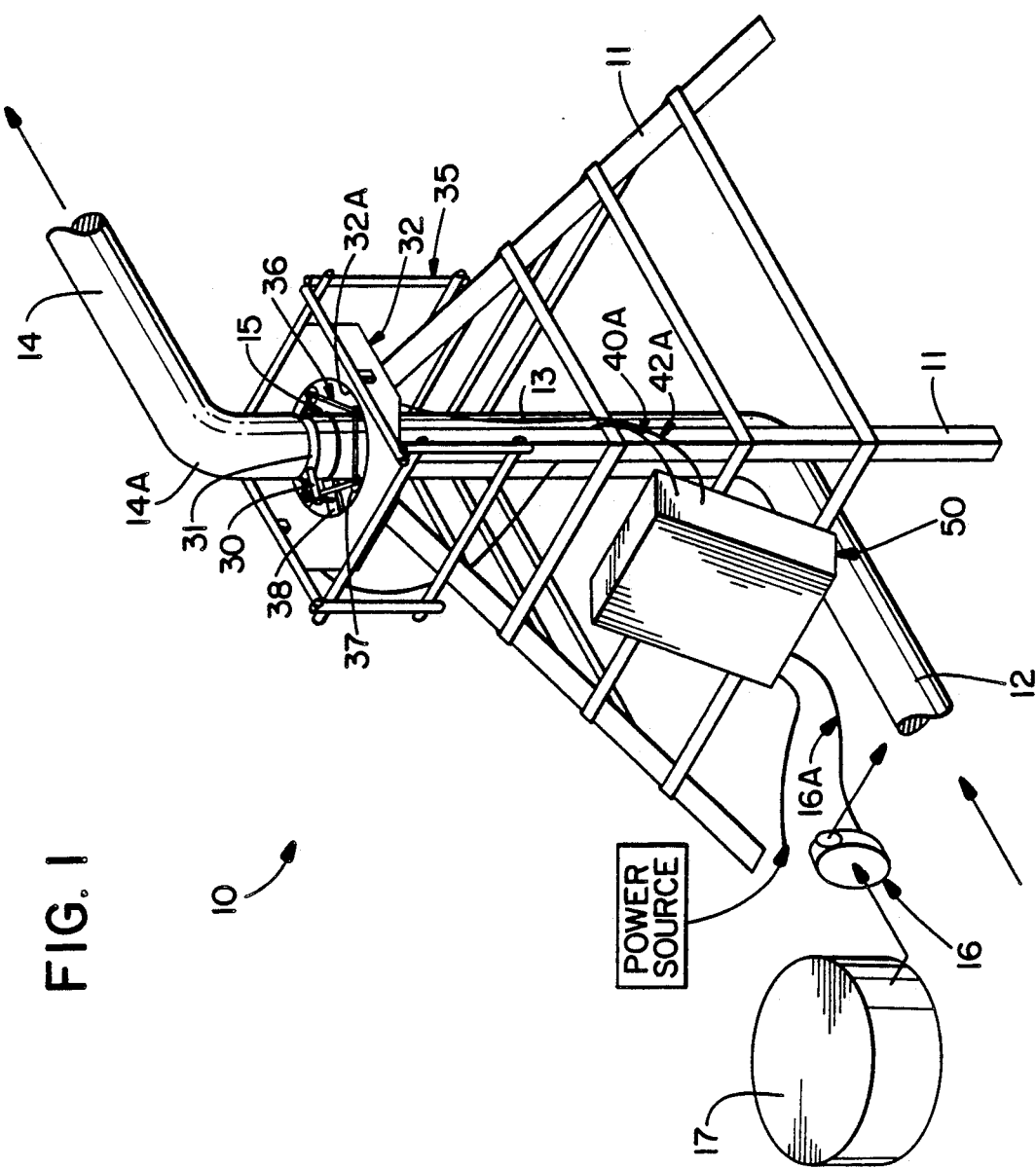
FIG. 1 is a perspective view illustrating the use of a system of the invention on a conventional center pivot irrigation system.

In FIG. 1 there is illustrated the central portion of a center pivot irrigation system 10 which includes a water feed supply pipe 12 (having vertical exit portion 13), and a horizontal sprinkler boom 14 operably connected by an elbow 14A to the upper end of vertical pipe section 13. Elbow 14A serves as a rotatable connector. A plurality of support braces 11 serve to maintain the pipe section 13 in a vertical position. The sprinkler boom may be, for example, 0.25 mile long or even longer if desired. It includes a plurality of sprinkler heads spaced along the boom.

Pump 16 is adapted to pump liquid fertilizer or other desired agricultural chemical from a supply source (e.g. a tank 17) to the water feed line 12 by means of a pipe line. The pump is preferably a positive displacement pump.

As shown in the drawings a rotation sensor is operably associated with the center pivot system so as to determine the degree of rotation of sprinkler boom 14 relative to the vertical feed pipe section 13. The boom rotates around the vertical feed pipe by means of joint 15.

The rotation sensor includes a finger 30 secured to elbow 14A by means of a band 31. The finger 30 is disposed horizontally and projects outwardly a few inches.

Surrounding the lower end of elbow 14A is a circuit board 32, for example, which includes a central opening 32A. The circuit board is securely fastened in a stationary position by means of framework 35. Carriage means 36 preferably includes grooved guide wheels 37 which engage the edge of the central opening in the circuit board and support the carriage in a horizontal plane.

Secured to one side of the carriage means is a plate 38 which has an upstanding fork-shaped member 38A. Finger 30 is adapted to engage upright member 38A and thereby move carriage 36 around the edge of the central opening in the circuit board as the sprinkler boom rotates around vertical feed pipe section 13.

Figure 2:
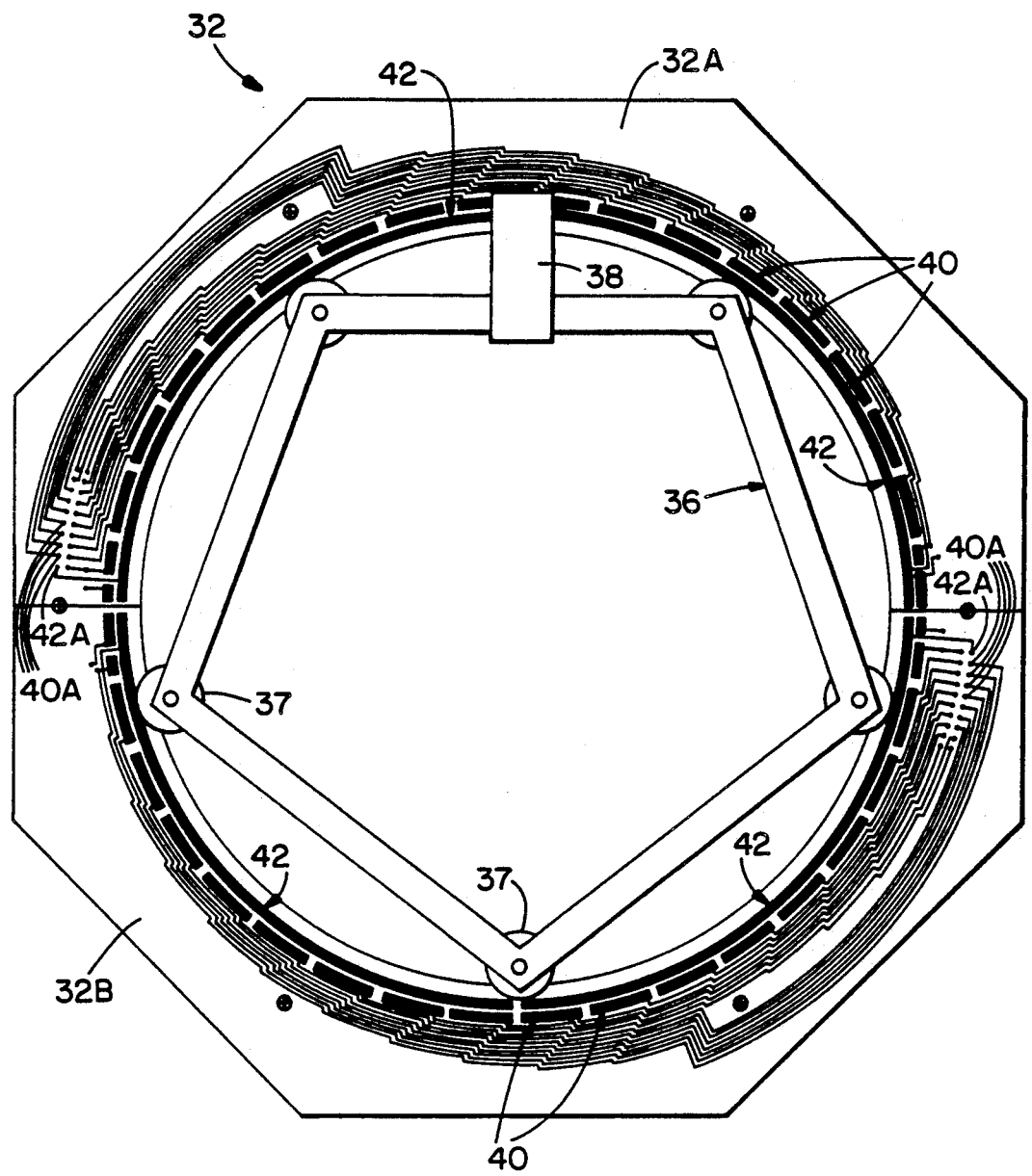
FIG. 2 is a bottom view illustrating a circuit board and sensor system which is useful in the system of FIG. 1.
Figure 3:
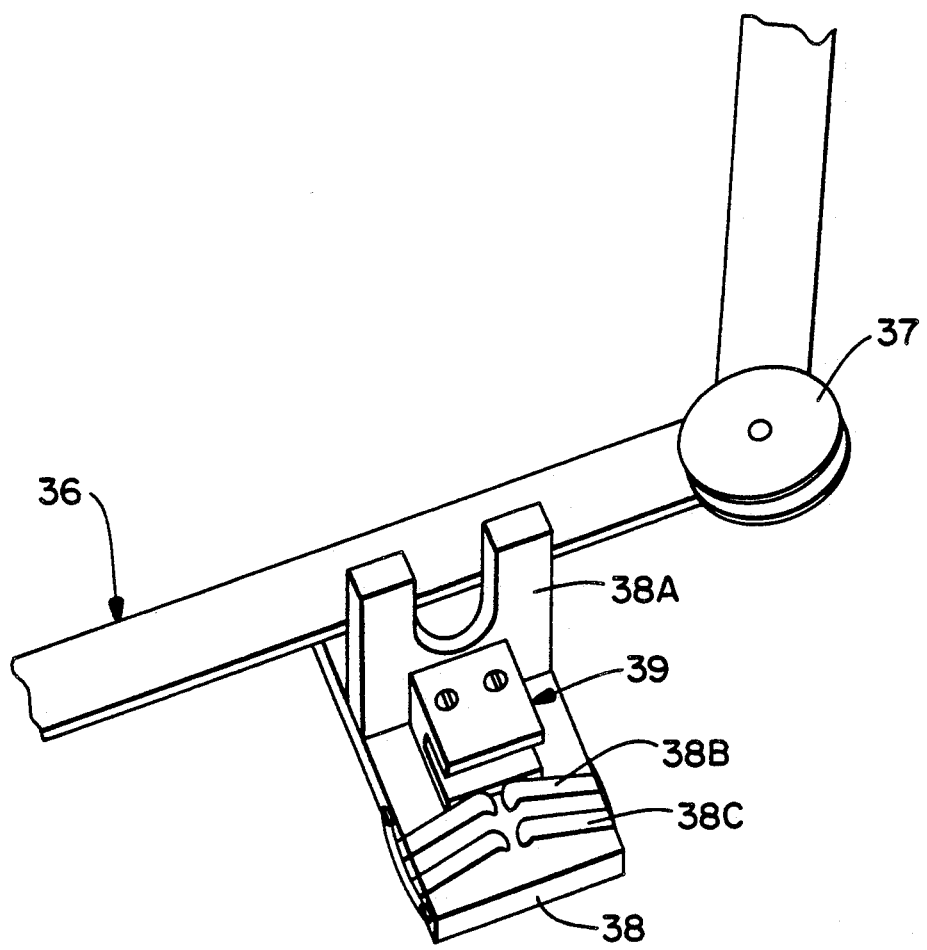
FIG. 3 is a perspective view illustrating one type of brush unit which is useful in the present invention.

The underside of circuit board 32 is illustrated in FIG. 2. To facilitate mounting of the circuit board around the lower end of the elbow 14A, the board may be provided in two sections 32A and 32B which can be fastened together after they have been positioned around the elbow.

A plurality of individual conductive segments or contact pads 40 are secured to the underside of board 32, as illustrated. The number and spacing of the conductive segments or contact pads determines the number and size of individual segments of the field to which different amounts of agricultural chemical can be supplied. For example, when there are 36 conductive segments or contact pads evenly spaced around board 32, the field is divided into 10° segments of a circle. Each conductive segment is separately connected by a conductive path to a terminal 40A. There may be any desired number of contact pads 40. It is not required that they be of equal size or length.

Concentric with, and spaced from, contact pads 40 there is another set of conductive segments or contact pads 42. In the embodiment shown in FIG. 2 there are four contact pads 42. This is for the purpose of dividing the circle into four equal segments or quadrants. There may be any desired number of contact pads 42, however, and they are not required to be of the same size or length. Each conductive segment or contact pad 42 is separately connected by a conductive path to a terminal or solder pad 42A.

Attached to plate 38 (carried on carriage means 36) are springy contacts or brushes 38B and 38C. As the carriage means is caused to rotate around the opening in the center of the circuit board the contacts or brushes 38B contact conductive segments 42 on the underside of board 32. Guide member 39 fastened to plate 38 includes a slot which engages the edge of the circuit board as the carriage is rotated around the central opening in the circuit board. Brushes 38C contact conductive segments 40 on the underside of board 32.

Because brushes 38B and 38C are in electrical communication with each other, an electrical connection is made via the brushes between each conductive segment 40 and an adjacent conductive segment 42 as the carriage means 36 is advanced or rotated around the opening in circuit board 32.

Figure 4A:
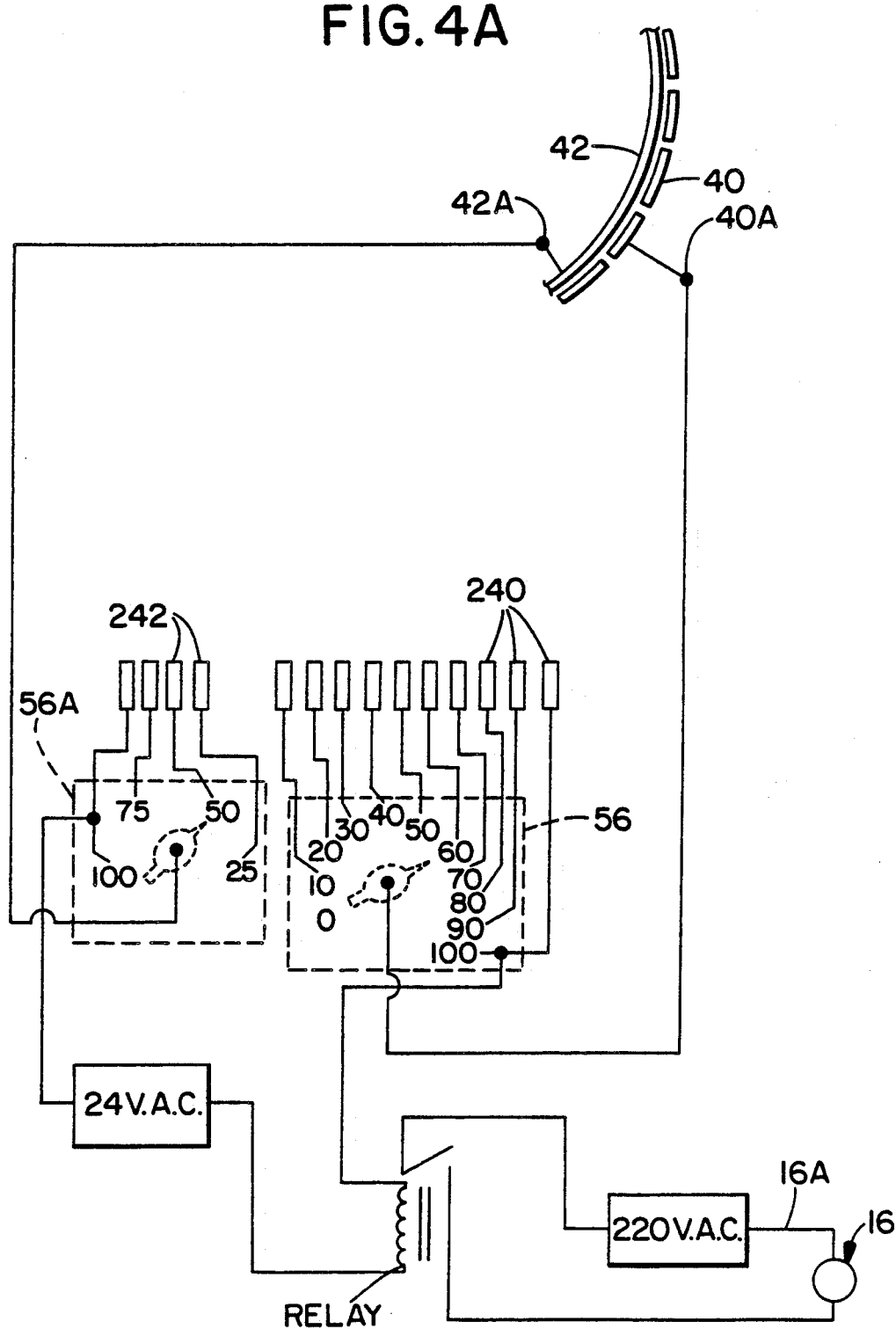
FIG. 4A is a schematic drawing illustrating the control systems.

Each terminal or pad 40A and each terminal or pad 42A is connected to the control system 50 which is illustrated in FIGS. 4 and 4A.

Control system 50 includes a first rotatable disc 52 and a second rotatable disc 54. Cables or wires 140A from terminals or solder pads 40A are connected to respective springy contacts 240 (i.e., spring steel brushes) in association with disc 52. Similarly, cables or wires 142A from terminals or solder pads 42A are connected to respective springy contacts 242 in association with disc 54, as illustrated in FIG. 4.

The control system further includes a plurality of rotary switches 56 and 56A carried on board or support 57. Although only a few of such switches are illustrated in FIG. 4, the entire board may be filled with such switches. Each switch 56 is electrically connected to a separate conductive segment or pad 40 of the circuit board. Each switch 56A is electrically connected to a separate conductive segment or pad 42A of the circuit board. Each switch 56 has a number of separate positions (e.g., from 0 to 100% settings). Each switch 56A also has a number of separate settings or positions. The control system is operably connected to the motor for pump 16 which supplies agricultural chemical into water feed line 12.

The surface of each disc 52 and 54 is non-conductive except in the areas where it is plated or covered with bands of conductive film or layer 52A and 54A, respectively (e.g. copper or aluminum). As illustrated in FIG. 4, the conductive bands on each disc vary in a step-wise manner across the radius of the disc. In other words, in the embodiment shown in FIG. 4 the conductive arc at one portion or band of the disc is different than the arc at another portion or band of the disc.

The free end or projecting end of each contact 240A and 242A presses against the surface of a respective disc as each disc rotates. Each such springy contact presses against a separate conductive band on a respective disc. The discs are connected electrically in series.

The rotating discs operate as switches to cycle the chemical supply pump on and off. The sweep of the contacts or brushes 240 and 242 over the conductive surface portions of the discs as they rotate determine the percentage of time that the pump delivers chemical at a full flow rate.

There are at least two rotating discs so as to provide two sets of selections. Disc 52 includes several separate conductive bands that provide percentages (e.g., from 10 to 100% of time that the switches 56 are activated. Disc 54 also includes separate conductive bands that provide percentages (e.g., 25, 50, 75 and 100% settings). Each switch 56A also has a number of separate settings or positions.

The discs are rotated at different speeds. Disc 52 is driven at about 0.5 revolution per minute in one direction by an O-ring belt and pulley system. Disc 54 is driven in the opposite direction at about 1 rpm by a gear motor. When a particular contact 240 and 242 are both in contact with a conductive portion of disc 52 and 54, respectively, then the circuit is completed and the pump runs at a constant rate to supply chemical to the feed line.

The rotary switches 56 allow the user to choose the percentage of time desired for the pump to operate at full flow for each separate segment of the area to be irrigated (as represented by the separate segments 40 on the circular circuit board). Also, rotary switches 56A allow the user to choose the percentage of time desired for the pump to operate at full flow for each separate quadrant or other such segment of the area to be irrigated (as represented by the separate segments 42 on the circular circuit board).

In the particular example illustrated in the drawings, each segment 40 has a rotary switch 56 connected thereto which allows selections of 0–100% in 10% increments. Also, each segment 42 has a rotary switch 56A connected thereto which allows selections of 25 to 100% in 25% increments.

Because the discs 52 and 54 are connected electrically in series, no current can flow unless a contact 240 and a contact 242 are each in electrical contact with a conductive portion of the surface of the respective discs at the same time. The product of the fraction of the circumference of the two discs which is conductive at the location of that particular contact or brush determines and controls the percentage of time that the pump operates and thus controls the amount of fertilizer or chemical applied to the corresponding segment of the field.

Thus, when the respective contacts are in contact with conductive portions of the surfaces of the two discs, an electrical current is supplied to the motor for pump 16. This causes the chemical to be supplied to the water feed line. Thus, a particular switch 56 corresponding to a particular segment 40 may be set, for example, at 60%. A switch 56A corresponding to a segment 42 which is adjacent to the particular segment 40 may be set, for example, at 50%. In this event the pump supplying chemical to the feed pipe would operate 50%×60%=30% of the time. In other words, during each minute of time that the sprinkler boom is in the segment or area of the field controlled by these particular conductive portions 40 and 42 on the circuit board, the chemical supply pump would only run for 18 seconds.

The amount of chemical applied to each selected segment of the field being irrigated can thus be predetermined by appropriate setting of corresponding switches 56 and 56A. As another example, each quadrant of the field can be divided into nine equal segments, and the amount of chemical applied to each separate segment in each quadrant may be varied by setting the segment switches 56 to separate values. Also, each quadrant switch 56A may be set at a different value (e.g., 25%, 50%, 75%, 100%). In such event, the pump would operate for different periods of time for the separate segments in each separate quadrant. This arrangement would be useful, for example, in changing the number of days over which the same amount of chemical is applied to separate segments of a field.

Other embodiments for controlling operation of the chemical supply pump as a function of the rotation of the elbow will be apparent.

The system of the invention is very effective and efficient for adjusting and controlling the rate, and timing, of application of chemicals to growing crops. It is particularly useful in testing situations where it is necessary or desirable to apply different amounts of one or more chemicals to separate segments of a field using a single irrigation system. The techniques of this invention enable preprogramming of the desired amount of chemicals to be applied to each segment of the field.

Then the growing crops in each segment can be tested to determine the most effective and efficient use of the chemicals (such as fertilizer, for example). In the case of corn, for example, a few plants from each segment of the field can be analyzed for uptake and utilization of nitrogen to determine the most efficient and effective amount of nitrogen-based fertilizer to be applied to the growing corn plants. The amount of fertilizer which should be applied to the growing plants may vary depending upon the size of the plants, environmental factors, type of soil, etc. By applying various amounts of fertilizer to different segments of the field it is possible to determine the most efficient amount and the most advantageous date for the fertilizer to be applied to the entire field.

The techniques and systems of the invention can also be utilized in connection with pipe irrigation systems other than the center pivot style, if desired. For example, the techniques could also be used in connection with systems in which a length of irrigation pipe is rolled across a field on large wheels in a straight line. The rotation sensor in such embodiment would travel with the irrigation pipe and would be capable of determining and signaling the separate segments of the field.

What is claimed is:

1. In combination with a center pivot irrigation system having a vertical water feed pipe, a horizontal sprinkler boom operably coupled to the upper end of said feed pipe by means of a rotatable connector, and an agricultural chemical supply means connected to said water feed pipe, wherein the improvement comprises:
   (a) rotation sensor means operably connected to said rotatable connector and being adapted to determine the degree of rotation of said horizontal boom relative to said vertical feed pipe; and
   (b) first and second control means operably connected to said rotation sensor means and being adapted to control the amount of said agricultural chemical supplied to said feed pipe in response to rotation of said horizontal boom relative to said vertical feed pipe.

2. The improvement in accordance with claim 1, wherein said rotation sensor means comprises
   (a) a stationary circular circuit board including a plurality of open contact pads thereon in separate segments corresponding to a predetermined number of segments of a circle;
   (b) carriage means adapted to be rotated in a circle by said rotatable connector;
   (c) a brush assembly carried by said carriage means, said brush assembly being adapted to make electrical contact with said contact pads on said circuit board;
wherein said carriage means rotates in response to the rotation of said connector about said vertical feed pipe.

3. The improvement in accordance with claim 2, wherein said circuit board includes first and second sets of open contact pads thereon; wherein said first set of open contact pads comprises a plurality of segments of a first length; and wherein said second set of open contact pads comprises a plurality of segments of a second length; wherein said first control means is connected to said first set of contact pads and said second control means is connected to said second set of contact pads; wherein said first and second control means are connected in series in a manner such that said chemical can be supplied to said feed pipe only when one of said first set of contact pads is in electrical contact with one of said second set of contact pads.

4. The improvement in accordance with claim 2, wherein said circuit board includes a central opening; wherein said upper end of said feed pipe extends through said central opening; and wherein said carriage means includes a plurality of guide wheels which are adapted to engage said circuit board at the edge of said central opening.

5. The improvement in accordance with claim 2, wherein said rotation sensor means further comprises a finger carried by said rotatable connector; wherein said finger is adapted to engage said carriage means.

6. The improvement in accordance with claim 3, wherein said first and second control means each comprises a rotating disc having conductive paths thereon, wherein the length of said conductive paths on said discs control the rate at which said chemical is supplied to said feed pipe when said brush assembly makes electrical contact with the contact pads of a respective segment of said circuit board.

7. The improvement in accordance with claim 6, wherein said first set of open contact pads comprises at least 4 segments; and wherein said second set of open contact pads comprises at least 2 segments; wherein said second set of open contact pads is spaced from and concentric with said first set of open contact pads.

8. The improvement in accordance with claim 3, further comprising pump means for supplying said chemical to said feed pipe; wherein said first and second control means comprise switch means for controlling the operation of said pump means.

9. In combination with a center pivot irrigation system having a vertical water feed pipe, a horizontal sprinkler boom operably coupled to the upper end of said feed pipe by means of a rotatable connector, and an agricultural chemical supply means connected to said water feed pipe, wherein the improvement comprises:
   (a) rotation sensor means operably connected to said rotatable connector and being adapted to determine the degree of rotation of said horizontal boom relative to said vertical feed pipe; wherein said rotation sensor means comprises;
      (i) a stationary circular circuit board including a plurality of open contact pads thereon in separate segments corresponding to a predetermined number of segments of a circle; wherein said circuit board includes a central opening; wherein said upper end of said feed pipe extends through said central opening;
      (ii) carriage means adapted to be rotated in a circle by said rotatable connector; wherein said carriage means rotates in response to the rotation of said connector about said vertical feed pipe;
      (iii) a brush assembly carried by said carriage means, said brush assembly being adapted to make electrical contact with said contact pads on said circuit board; and
   (b) control means operably connected to said rotation sensor means and being adapted to control the amount of said agricultural chemical supplied to said feed pipe in response to rotation of said horizontal boom relative to said vertical feed pipe.

10. The improvement in accordance with claim 9, wherein said circuit board includes first and second sets of open contact pads thereon; wherein said first set of open contact pads comprises a plurality of segments of a first length; and wherein said second set of open contact pads comprises a plurality of segments of a second length; further comprising pump means for supplying said chemical to said feed pipe; wherein said control means comprises first and second rotatable discs for controlling the operation of said pump means.

11. The improvement in accordance with claim 10, wherein each said disc has conductive paths thereon, wherein the length of said conductive paths control the rate at which said chemical is supplied to said feed pipe when said brush assembly makes electrical contact with the contact pads of a respective segment of said circuit board.

12. A method for determining plant utilization of fertilizer in a field being irrigated by a center pivot irrigation system of the type having a vertical water feed pipe, a horizontal sprinkler boom operably coupled to the upper end of said feed pipe by means of a rotatable connector, and a fertilizer supply means connected to said water feed pipe, wherein said method comprises the steps of:
 (a) providing rotation sensor means,
 (b) operably connecting said rotation sensor means to said rotatable connector,
 (c) providing first and second control means for controlling the amount of said fertilizer supplied to said feed pipe in response to rotation of said horizontal boom,
 (d) operably connecting said first and second control means to said rotation sensor means,
 (e) irrigating said plants with said irrigation system and adding said fertilizer to said water feed pipe in an amount which varies from one segment of said field to another in response to rotation of said sprinkler boom relative to said vertical feed pipe, and
 (f) analyzing said plants from each said segment of said field to determine said utilization of said fertilizer by said plants in each said segment.

13. A method in accordance with claim 12, wherein said rotation sensor means comprises
 (a) a stationary circular circuit board including a plurality of open contact pads thereon in separate segments corresponding to a predetermined number of segments of a circle;
 (b) carriage means adapted to be rotated in a circle by said rotatable connector;
 (c) a brush assembly carried by said carriage means, said brush assembly being adapted to make electrical contact with said contact pads on said circuit board;
wherein said carriage means rotates in response to the rotation of said connector about said vertical feed pipe.

14. A method in accordance with claim 12, wherein said fertilizer comprises a nitrogen-containing compound, wherein said plants are analyzed for amount of said nitrogen-containing compound present therein.

15. A method in accordance with claim 14, wherein said fertilizer comprises a mixture of ammonium nitrate and urea.

16. A method in accordance with claim 12, wherein said circuit board includes a central opening; wherein said upper end of said feed pipe extends through said central opening; and wherein said carriage means includes a plurality of guide wheels which are adapted to engage said circuit board at the edge of said central opening.

17. A method in accordance with claim 12, wherein said plants are corn plants.

18. A method in accordance with claim 16, wherein said circuit board includes first and second sets of open contact pads thereon; wherein said first set of open contact pads comprises a plurality of segments of a first length; and wherein said second set of open contact pads comprises a plurality of segments of a second length; and wherein said first and second control means each comprises a rotating disc having conductive paths thereon, wherein the length of said conductive paths on said discs control the rate at which said chemical is supplied to said feed pipe when said brush assembly makes electrical contact with the contact pads of a respective segment of said circuit board.

19. A method in accordance with claim 18, further comprising pump means for supplying said chemical to said feed pipe; wherein said first and second control means comprise switch means for controlling the operation of said pump means.

* * * * *